Jan. 21, 1930.  V. F. GRACE  1,744,543
COMBINATION BUBBLE CAP AND DOWNFLOW
Filed Oct. 3, 1927
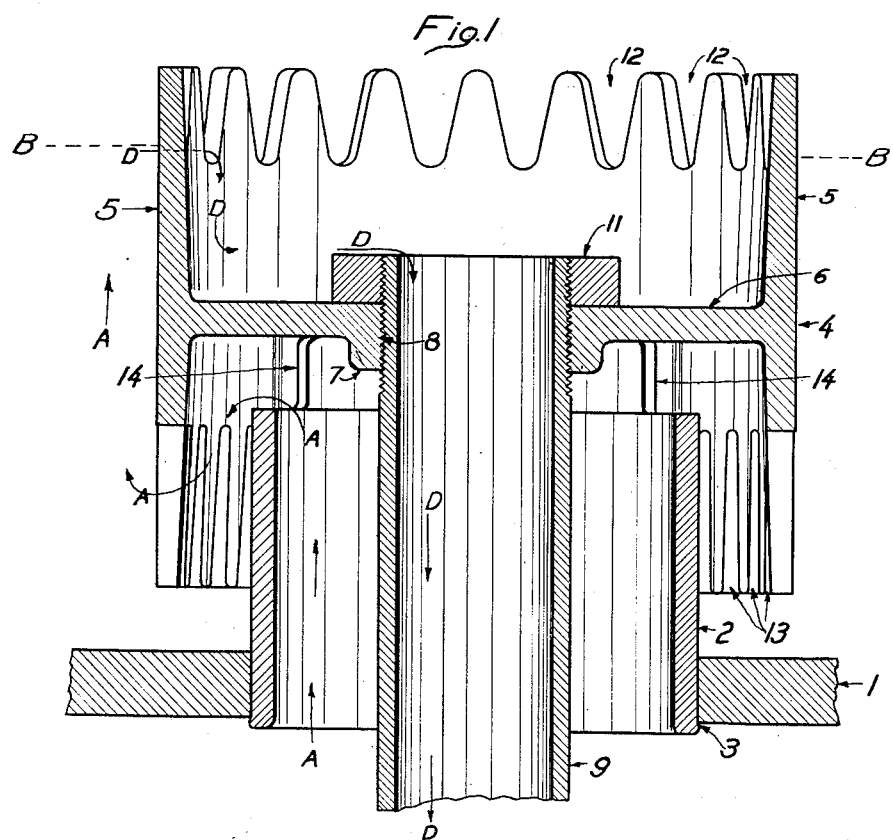
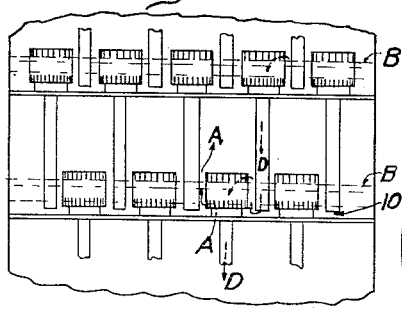
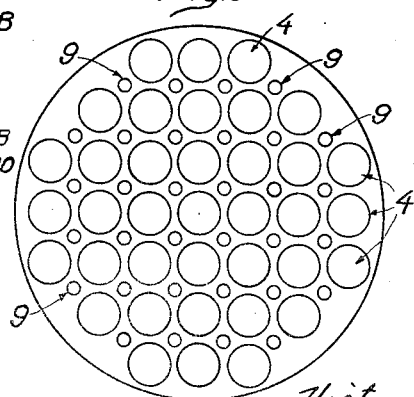
Victor F. Grace
INVENTOR Patented Jan. 21, 1930

1,744,543

UNITED STATES PATENT OFFICE

VICTOR F. GRACE, OF LOS ANGELES, CALIFORNIA

COMBINATION BUBBLE CAP AND DOWNFLOW

Application filed October 3, 1927. Serial No. 223,661.

In the type of vapor dephlegmator known as the bubble tower, the vapors from a still or other vapor producing device are passed upward through a multiplicity of scrubbing pans or trays arranged in a stack inside a relatively narrow and high tower.

In each tray are fixed a number of short nozzles projecting above the tray and over each of these nozzles is fixed an inverted cup, usually having its lower edge serrated or grooved. Each tray also carries a run back pipe which passes through the tray, projects above it to a sufficient height to maintain a layer of liquid on the tray, and projects downward to such length that its lower end is immersed in and sealed by the liquid on the next lower tray.

By means of the inverted cups the vapors passing upward through the nozzles are carried below the surface of the liquid condensate collecting on the tray and are thereby thoroughly scrubbed. Any excess of condensate overflows the upper end of the runback pipe and thus passes downward from tray to tray until it is finally withdrawn from the bottom of the tower.

In the bubble towers heretofore used there are a large number of nozzles and cups on each tray and but one runback, which is usually placed at one side of the tray and at opposite sides of adjacent trays. The condensate collecting on one tray thus moves slowly over its surface to the side where the runback is located, then down the runback and to the opposite side of the next tray, and so on.

I have discovered that, particularly in the large dephlegmators now in use, the condensate tends to flow more rapidly across the center line of the tray than at its edges, and that there is a highly material difference in quality of condensate between the back edge, or portion farthest from the runback, and the portion immediately around the runback. The effectiveness of the condensate as a scrubbing medium is thus materially reduced, as to obtain the best results it must be of uniform quality over the entire surface of the tray so that each portion of the condensate may be subjected to the same amount of reevaporation by contact with up-flowing vapors, and each stream of vapor may be contacted with condensate having the same power of absorbing and withdrawing its heaviest and least volatile constituents.

To overcome the disadvantages of the type of construction heretofore used I prefer to use the new and improved bubble cap illustrated in the attached drawings, in which provision is made for taking the excess condensate downward through each cap to the tray below, thus draining all parts of each tray uniformly and insuring the maintenance on each tray of a layer of condensate of uniform quality over its entire area. By this means uneven scrubbing is avoided and the highest dephlegmating efficiency is secured.

In these drawings

Fig. 1 is a detail of my improved bubble cap in vertical section and inside elevation, Fig. 2 is a diagram of a section of a bubble tower, showing two trays fitted with my improved bubble cap, in elevation, and Fig. 3 is a diagram in plan of a single tray, suggesting a lay-out for the bubble caps indicated by the large circles, the small circles indicating the runback pipes from the caps affixed to the tray next above.

Referring to Fig. 1, 1 is a portion of the bottom plate of the tray. 2 is a short pipe nozzle securely fixed in the plate, as by expanding, as indicated at 3.

The bubble cap proper is represented at 4. It may advantageously be a smooth iron casting having cylindrical walls 5—5 and a web 6 dividing it into two cups of approximately equal depth. The web 6 may have in its center a boss 7 threaded as at 8 to a suitable iron-pipe size, and into this thread is screwed a piece of pipe 9 of the same size and of a length sufficient to submerge the lower end of the pipe in the liquid accumulated on the next lower tray, as at 10 in Fig. 2. This pipe may be prevented from further movement by the lock-nut 11.

The upper edge of the cylindrical wall may be serrated or groved as illustrated at 12 and the lower edge may be similarly serrated as indicated at 13. The cap is supported in position on the nozzle 2 by means of the radial webs 14—14, of which three or more may be used. The lower edge of these webs and the upper end of the nozzle 2 should be carefully faced so that the cup will stand parallel and horizontal to plate 1 and so that all the cups on any one tray will stand at the same height above the bottom plate, which must itself be perfectly flat and set level in the stack. Obviously if one or more of these cups were lower in position than those on the same tray, the overflow would be diverted to the lower cups and an excess flow of vapor to the higher. The lower edges of the webs 14 may desirably be nicked where they rest on the nozzle, to prevent lateral displacement of the cup in the nozzle.

As indicated in the drawing the lower edge of the lower cup may be serrated, notched or perforated in any suitable manner or combination for the purpose of subdividing the flow of vapors into numerous small streams or bubbles for procuring increased contact of vapors with the liquid on the tray. The upper edge of the upper cup may likewise be serrated, notched or perforated for the purpose of restricting the flow of liquid into said cup thereby raising to some extent the liquid level outside of said cup and producing a more even circumferential flow of liquid into said cup than may be procured by the use of a plane edge.

In the operation of my improved bubble cap the liquid level in the trays is as indicated by the dotted lines B. The direction of vapor flow is as indicated by the arrows A and the direction of flow of condensate is as indicated by the arrows D, in Figures 1 and 2.

I claim as my invention:

1. In a bubble tower having a plurality of vertically spaced plates each supplied with a relatively short tube for the upward passage of vapors, an inverted cup dependent over said vapor tube and adapted to permit the escape of vapors under its lower edge; an upward-looking cup integral with said inverted cup and adapted to drain liquid from the plate to which said vapor tube is attached, and a liquid pipe within said vapor tube, said liquid pipe being adapted to drain said upward-looking cup and being of such length as to seal in liquid on the plate next below said first plate.

2. In a bubble tower having a plurality of vertically spaced plates each provided with a relatively short tube for the upward passage of vapors, an inverted cup dependent over said vapor tube and adapted to permit the escape of vapors under its lower edge; an upward-looking cup integral with said inverted cup and adapted to drain liquid from the plate to which said vapor tube is attached, the free edge of one of said cups being serrated, and a liquid pipe within said vapor tube, said liquid pipe being adapted to drain said upward-looking cup and being of such length as to seal in liquid on the plate next below said first plate.

3. In a bubble tower having a plurality of vertically spaced plates each provided with a relatively short tube for the upward passage of vapors, an inverted cup dependent over said vapor tube and adapted to permit the escape of vapors under its lower edge; an upward-looking cup integral with said inverted cup and adapted to drain liquid from the plate to which said vapor tube is attached, the free edge of both of said cups being serrated, and a liquid pipe within said vapor tube, said liquid pipe being adapted to drain said upward-looking cup and being of such length as to seal in liquid on the plate next below said first plate.

In witness that I claim the foregoing I have hereunto subscribed my name this 22d day of September, 1927.

VICTOR F. GRACE.